(12) United States Patent
Mano et al.

(10) Patent No.: US 8,917,278 B2
(45) Date of Patent: Dec. 23, 2014

(54) APPARATUS, SYSTEM, AND METHOD OF OUTPUTTING IMAGE, AND RECORDING MEDIUM STORING IMAGE OUTPUT CONTROL PROGRAM

(71) Applicants: Takuro Mano, Kanagawa (JP); Baba Hiroshi, Kanagawa (JP); Shinsuke Yanazume, Kanagawa (JP); Hiroki Ozaki, Kanagawa (JP)

(72) Inventors: Takuro Mano, Kanagawa (JP); Baba Hiroshi, Kanagawa (JP); Shinsuke Yanazume, Kanagawa (JP); Hiroki Ozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 122 days.

(21) Appl. No.: 13/682,899

(22) Filed: Nov. 21, 2012

(65) Prior Publication Data

US 2013/0162663 A1    Jun. 27, 2013

(30) Foreign Application Priority Data

Dec. 22, 2011  (JP) ................................ 2011-281740

(51) Int. Cl.
| | |
|---|---|
| *G09G 5/39* | (2006.01) |
| *G06T 1/60* | (2006.01) |
| *G06F 3/14* | (2006.01) |
| *H04N 9/31* | (2006.01) |

(52) U.S. Cl.
CPC ... *G06T 1/60* (2013.01); *G06F 3/14* (2013.01); *H04N 9/3179* (2013.01)
USPC ......................................... 345/531; 345/530

(58) Field of Classification Search
CPC .................................... G06T 1/60; G09G 5/39
USPC .................................................. 345/530, 531
See application file for complete search history.

(56) References Cited

U.S. PATENT DOCUMENTS

| | | | |
|---|---|---|---|
| 2006/0064297 A1 | 3/2006 | Sugishita et al. | |
| 2007/0076244 A1 | 4/2007 | Suzuki et al. | |
| 2007/0294616 A1 | 12/2007 | Kizaki | |
| 2008/0055667 A1 | 3/2008 | Baba | |
| 2008/0175565 A1* | 7/2008 | Takakura et al. | 386/124 |
| 2009/0034723 A1 | 2/2009 | Yanazume | |
| 2009/0106666 A1* | 4/2009 | Nomura | 715/748 |
| 2009/0109471 A1 | 4/2009 | Yanazume et al. | |
| 2010/0103450 A1 | 4/2010 | Yanazume | |
| 2011/0016474 A1 | 1/2011 | Sugishita et al. | |
| 2011/0205573 A1 | 8/2011 | Yanazume et al. | |

(Continued)

FOREIGN PATENT DOCUMENTS

| | | |
|---|---|---|
| JP | 2001-229176 | 8/2001 |
| JP | 2007-220025 | 8/2007 |

*Primary Examiner* — Jacinta M Crawford
(74) *Attorney, Agent, or Firm* — Harness, Dickey & Pierce, P.L.C.

(57) ABSTRACT

An apparatus, system, and method of outputting an image, and image output control program stored in a recording medium are described. The image output apparatus that displays data through a display obtains first element identification information for identifying a first element included in a specified folder, determines whether the first element is a folder based on the first element identification information, obtains second element identification information for identifying a second element included in the first element when the first element is determined to be the folder, analyzes whether the second element is a data file having a data format compatible with the display to generate an analysis result, determines a display format of the first element that is determined to be the folder based on the analysis result of the second element, and causes the display to display an image that reflects the first element in the determined display format.

30 Claims, 10 Drawing Sheets

(56) References Cited

U.S. PATENT DOCUMENTS

| | | |
|---|---|---|
| 2011/0222101 A1 | 9/2011 | Nakamura et al. |
| 2011/0304878 A1 | 12/2011 | Yanazume et al. |
| 2012/0096348 A1 | 4/2012 | Nagamine et al. |
| 2012/0117570 A1 | 5/2012 | Ozaki et al. |
| 2012/0259879 A1 | 10/2012 | Ozaki et al. |

* cited by examiner

FIG. 6

| DATA TYPE | COMPATIBLE EXTENSION |
|---|---|
| FOLDER | – |
| FILE | "jpg", "jpeg", "mpg", "mpeg" · · · |

FIG. 7A

DATA NAME: FOLDER 1
DATA TYPE: FOLDER
· · ·

FIG. 7B

DATA NAME: PICTURE.jpg
DATA TYPE: FILE
· · ·

FIG. 8

UPDATED DATE/TIME: xxxx/xx/xx xx : xx
CREATED DATE/TIME: xxxx/xx/xx xx : xx
PROPERTY: HIDDEN FILE
· · ·

| ELEMENT NAME | DATA TYPE | FORMAT CHANGE |
|---|---|---|
| FOLDER 1 | FOLDER | × |
| FOLDER 2 | FOLDER | × |
| FOLDER 3 | FOLDER | ○ |
| PICTURE 1.jpg | FILE | × |

FIG. 13A

| ¥ root | | |
|---|---|---|
| DATA NAME | | UPDATED DATE/TIME |
| 📁 FOLDER 1 | ⌛ | xxxx/xx/xx |
| 📁 FOLDER 2 | ⌛ | xxxx/xx/xx |
| 📁 FOLDER 3 | ⌛ | xxxx/xx/xx |
| 📄 PICTURE 1.jpg | | xxxx/xx/xx |

| ¥ root | | |
|---|---|---|
| DATA NAME | | UPDATED DATE/TIME |
| 📁 FOLDER 1 | | xxxx/xx/xx |
| 📁 FOLDER 2 | | xxxx/xx/xx |
| 📁 FOLDER 3 | ⌛ | xxxx/xx/xx |
| 📄 PICTURE 1.jpg | | xxxx/xx/xx |

| DATA TYPE | COMPATIBLE EXTENSION | COMPATIBLE DATA FORMAT |
|---|---|---|
| FOLDER | − | |
| FILE | "jpg", "jpeg" | "JFIF" · · · |
| | "mpg", "mpeg" | "mpg-2", "mpeg-4" · · · |
| | · · · | |

| FOLDER ANALYSIS RESULT | DISPLAY SETTINGS |
|---|---|
| DATA FOR DISPLAY | NORMAL |
| EMPTY | BLACKOUT |
| NO DATA FOR DISPLAY | GRAYOUT |
| FOLDER ONLY | EXCLAMATION |
| . . . | |

| ¥ root | | |
|---|---|---|
| | DATA NAME | UPDATED DATE/TIME |
| | FOLDER 1 / | xxxx/xx/xx |
| | FOLDER 2 | xxxx/xx/xx |
| | FOLDER 3 | xxxx/xx/xx |
| | PICTURE 1.jpg | xxxx/xx/xx |

APPARATUS, SYSTEM, AND METHOD OF OUTPUTTING IMAGE, AND RECORDING MEDIUM STORING IMAGE OUTPUT CONTROL PROGRAM

CROSS-REFERENCE TO RELATED APPLICATIONS

This patent application is based on and claims priority pursuant to 35 U.S.C. §119 to Japanese Patent Application No. 2011-281740, filed on Dec. 22, 2011 in the Japan Patent Office, the entire disclosure of which is hereby incorporated by reference herein.

BACKGROUND OF THE INVENTION

1. Field of the Invention

The present invention generally relates to an apparatus, system, and method of outputting an image, and an image output control program stored in a recording medium.

2. Description of the Related Art

As one example of image output apparatus that outputs an image for display, a projector apparatus projects an image based on an image signal input to the projector apparatus onto a screen. The recent projector apparatus is provided with the additional function of obtaining information regarding a data file or a folder stored in an external resource such as an external recording medium connected to a universal serial bus (USB) port or a file server accessible over a network. For example, the projector apparatus obtains information regarding a data file or a folder from the external resource, and projects an image based on the obtained information regarding the data file or the folder on the screen. Since the projector apparatus is not usually provided with a mouse or a keyboard, it has been cumbersome for a user to select a specific data file or folder from the screen, especially when the screen displays a large number of data files or folders.

Further, while the projector apparatus can obtain information regarding a data file or folder from the external resource, reading information stored in the external resource require some time. Even when a folder contains no data file, the projector apparatus tries to read out information from the external resource and displays that no data file is in the folder. In such case, all the time used for reading out information regarding the data file or folder, as well as, the user's operation to generate an instruction, will have been wasted.

SUMMARY OF THE INVENTION

In view of the above, one object of the present invention is to provide an apparatus, system, and method of outputting an image based on information regarding a data file or a folder stored in a memory, in a manner such that the user is discouraged from generating an instruction for displaying information regarding a folder when the folder contains no data for display.

In one example, the present invention may reside in an image output apparatus, which includes a processing circuit that generates display data in the form of an image signal, and a display that displays an image based on the image signal of the display data. The processing circuit obtains first element identification information for identifying a first element included in the specified folder, and determines whether the first element is a folder based on the first element identification information. When the first element is determined to be the folder, the processing circuit obtains second element identification information for identifying a second element included in the first element. The processing circuit further analyzes whether the second element is a data file having a data format compatible with the display to generate an analysis result, using compatible data format information indicating one or more data formats from which the processing circuit can generate an image signal of display data. Based on the analysis result of the second element, the processing circuit determines a display format of the first element that is determined to be the folder, and generates first display data that causes the display to display an image reflecting the first element in the determined display format.

For example, the image output apparatus may be implemented by a projector apparatus that displays a projection image on a projection screen, which displays information regarding the specified folder stored in a memory. When the first element of the specified folder, which is determined to be a folder, contains no second element that is a data file having a data format compatible with the projector apparatus, the projector apparatus displays the first element being the folder in a display format different from a default display format. In one example, the display format different from the default display format may be a grayout display format. As the first element being the folder is displayed in the display format, which is determined based on the analysis result, the user can instantly recognize that the first element has no data for display. This discourages the user from selecting the first element.

In another example, the present invention may reside in a method of controlling output of an image through a display of an image output apparatus. The method includes: receiving a user instruction for displaying information regarding a folder specified by a user; obtaining first element identification information for identifying a first element included in the specified folder; determining whether the first element is a folder based on the first element identification information; obtaining second element identification information for identifying a second element included in the first element, when the first element is determined to be the folder; analyzing whether the second element is a data file having a data format compatible with the display to generate an analysis result, using compatible data format information indicating one or more data formats from which the image output apparatus can generate an image signal of display data for display; determining a display format of the first element that is determined to be the folder based on the analysis result of the second element; and generating first display data, which causes the display to display an image that reflects the first element in the determined display format.

In another example, the above-described image output method may be implemented in the form of a computer program, which is stored in a non-transitory recording medium.

In another example, the present invention may reside in an image output system, which includes the above-described image output apparatus, and an external resource that is accessible by the image output apparatus. The external resource functions as a memory storing at least the specified folder.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an example data structure of a data format information table, managed by the projector apparatus of FIG. 1;

FIG. 7A is an illustration for explaining element identification information regarding a folder;

FIG. 7B is an illustration for explaining element identification information regarding a file;

FIG. 8 is an illustration for explaining property information of a file;

FIG. 13A is an example list display screen displaying contents of the folder of FIG. 9, before completing determination of a display format of each folder;

FIG. 13B is an example list display screen displayed after the list display screen of FIG. 13A, which displays contents of the folder of FIG. 9;

FIG. 14 is an example data structure of a data format information table, managed by the projector apparatus of FIG. 1;

Figure 1:
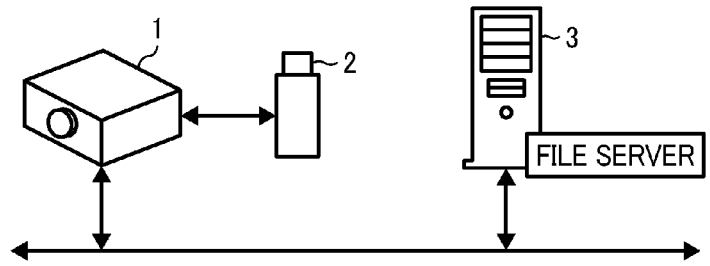
FIG. 1 is a configuration of an image output system including a projector apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIG. 1 illustrates an example configuration of an image output system in which a projector apparatus 1 is provided. The projector apparatus 1 is connected to an external memory 2, such as an external recording medium including a USB. The projector apparatus 1 is further connected to a file server 3 through a network such as a local area network (LAN).

The projector apparatus 1 functions as a display that displays various information to one or more users. For example, the projector apparatus 1 may be used in a meeting room to display a presentation material to the meeting participants. The projector apparatus 1 projects an image on a projection screen based on an image signal, which may be input to the projector apparatus 1 or generated at the projector apparatus 1 based on the input image signal. The projector apparatus 1 further processes various data or information to allow the user to view a list of files or folders that are available for access by the user. As described below, in one example, the projector apparatus 1 generates an image signal based on data stored in an external resource such as the external memory 2 or the file server 3, and projects an image based on the generated image signal to the projection screen.

The external memory 2 is a removable recording medium such as a universal serial bus (USB) memory, which can be connected to the projector apparatus 1 through a USB interface. The file server 3, which may be implemented by one or more general-purpose computers, provides a storage area to the projector apparatus 1 over the network. In this example, the projector apparatus 1 is connected to the file server 3 through a network communication interface such as a LAN port. As described above, the projector apparatus 1 refers to information stored in the external memory 2 or the file server 3, and controls data to be displayed onto a screen based on the obtained information. In addition to or in alternative to the external memory 2 or the file server 3, the projector apparatus 1 may be connected to any other external resource storing data such as a notebook computer, a portable phone, a smart phone, a digital camera, etc.

Figure 2:
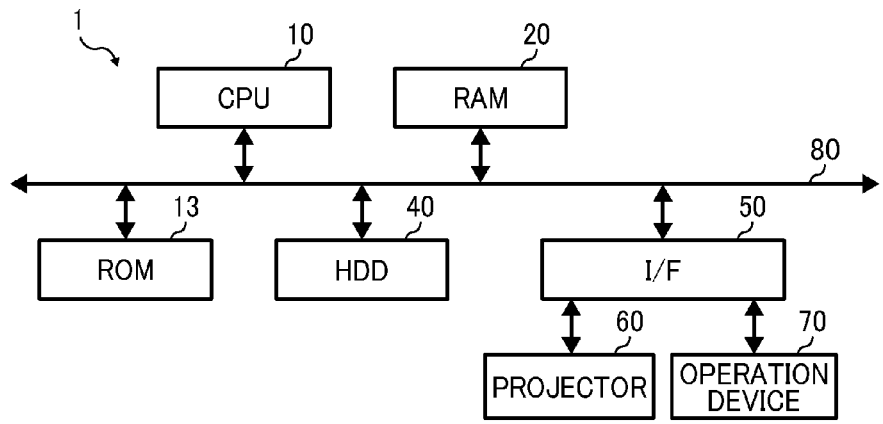
FIG. 2 is a schematic block diagram illustrating a hardware structure of the projector apparatus of FIG. 1, according to an example embodiment of the present invention.

Referring now to FIG. 2, a hardware structure of the projector apparatus 1 is explained according to an example embodiment of the present invention. As illustrated in FIG. 2, the projector apparatus 1 incorporates therein a general-purpose computer having a hardware structure of FIG. 2. The projector apparatus 1 includes a central processing unit (CPU) 10, a random access memory (RAM) 20, a read only memory (ROM) 30, a hard disk drive (HDD) 40, and an interface (UF) 50, which are connected through a bus 80. The OF 50 is connected with a projector 60 and an operation device 70.

The CPU 10, which may be implemented by a microprocessor, controls entire operation of the projector apparatus 1. The RAM 20 is implemented by a volatile memory capable of reading or writing various data with relatively high speeds. The ROM 30 is implemented by a read-only nonvolatile memory, which may store various control programs such as firmware. The HDD 40 may be implemented by a rewritable or writable nonvolatile memory, such as a nonvolatile RAM (NVRAM), which may store the operating system (OS), various control programs, and application programs.

The I/F 50 controls connections between the bus 80 and various hardware devices of the projector apparatus 1, or connections between the projector apparatus 1 and various outside devices such as the external memory 2 or the file server 3. Assuming that the I/F 50 is used to communicate with the external memory 2, the I/F 50 is implemented by a USB port to which the USB memory is inserted. Assuming that the I/F 50 is used to communicate with the file server 3, the I/F 50 may be implemented by a network interface circuit (NIC). The I/F 50 may be implemented by a medium drive, which reads out or writes in data with respect to a removable recording medium such as an optical disc.

The projector 60 projects an image on a projection surface such as a screen. In this example, the projector 60 may use any desired projection technologies including digital light processing (DLP) technology using one or more digital micro minor devices (DMDs). More specifically, the projector 60 includes a light source, a light valve, and a projection optical system. The light source is provided with a lamp, and a light polarizing element that converts light irradiated from the lamp to linear polarized light. The lamp may be implemented by, for example, a halogen lamp, metal halide lamp, high-pressure mercury lamp, laser, or light emitting diode (LED). The light valve is provided with an image forming section, on which an image is formed based on an image signal generated based on an input image signal received from the outside apparatus. The projection optical system includes a lens system, a focus adjuster, and a zoom adjuster. The focus adjuster adjusts the focus of a projection image to be displayed on the screen. The zoom adjuster enlarges or reduces the size of the projection image by zooming in or out.

To project an image on the screen, the light irradiated from the light source is directed to the image formed on the image forming section of the light valve. The projection optical system projects the image formed on the image forming section, which is irradiated with the light, toward the outside to display the image as the projection image on the screen.

The operation device 70 functions as a user interface, which allows the user to operate the projector apparatus 1. The operation device 70 may include a plurality of operation keys that are provided on a surface of the projector apparatus 1, and/or a remote controller that outputs a control signal to control operation of the projector apparatus 1. In this example, it is assumed that user operability of the projector apparatus 1 is lower than that of the PC, as the operation device 70 of the projector apparatus 1 is not implemented by a mouse and a keyboard.

In operation, the CPU 10 loads an image output control program from a nonvolatile memory such as the ROM 30 or the HDD 40, or a removable recording medium through the I/F 50, onto the RAM 20 to generate a set of instructions that function as a software controller. The software controller operates in cooperation with the hardware devices of FIG. 2 to cause the projector apparatus 1 to have a functional structure of FIG. 3.

Figure 3:
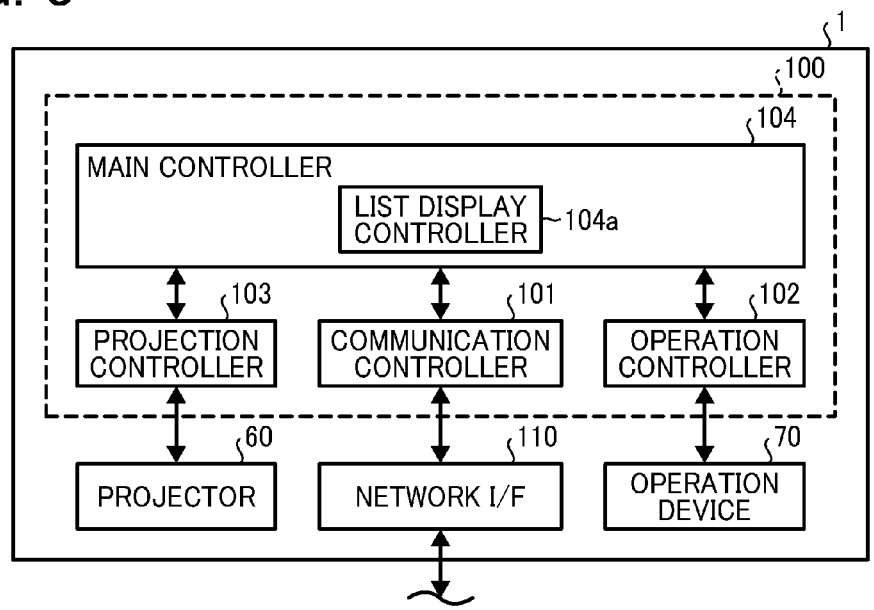
FIG. 3 is a schematic block diagram illustrating a functional structure of the projector apparatus of FIG. 1, according to an example embodiment of the present invention.

Referring now to FIG. 3, the functional structure of the projector apparatus 1 is explained according to an example embodiment of the present invention. As illustrated in FIG. 3, the projector apparatus 1 includes the projector 60, the operation device 70, a controller 100, and a network I/F 110. The controller 100 includes a communication controller 101, an operation controller 102, a projection controller 103, and a main controller 104. The main controller 104 includes a list display controller 104a.

The projector apparatus 1 further includes a connection port to which the external memory 2 is connected, such as the USB port to which the USB memory is connected. The main controller 104 is capable of reading various data from the external memory 2 that is connected to the connection port. The network I/F 110 functions as a communication interface, which allows the projector apparatus 1 to communicate with another apparatus over the network. The network I/F 110 may be implemented by the Ethernet (Registered trademark) interface. The network I/F 110 and a connection port of the external memory 2 are implemented by the I/F 50 of FIG. 2.

The controller 100 is implemented by a combination of hardware and software units. More specifically, the CPU 10 (FIG. 2) loads control programs from a nonvolatile memory such as the ROM 30, HDD 40, or a nonvolatile recording medium such as an optical disc, onto a volatile memory such as the RAM 20 to generate a set of instructions that function as a software controller. The software controller operates in cooperation with the hardware devices of FIG. 2 to cause the projector apparatus 1 to have the controller 100. The controller 100 controls an entire operation of the projector apparatus 1.

The communication controller 11 obtains various data input through the network OF 110. The communication controller 11 transmits various data to another device through the network I/F 110. In this example, the list display controller 104a controls the communication controller 110 to refer to information stored in the file server 3 through the network I/F 110.

The operation controller 102 receives an operation signal based on a user input to the operation device 70, and inputs the operation signal to the main controller 104.

The projection controller 103 causes the projector 60 to project an image such as a graphical user interface (GUI) generated by the list display controller 104a, on the projection screen.

The main controller 104 controls operation of the projector apparatus 1 through one or more modules of the controller 100. The main controller 104 may be implemented by software that provides specific functions for execution by the CPU 10. The list display controller 104a may be implemented by software that provides specific function for execution by the CPU 10.

In the following examples, the main controller 104 reads out information regarding a file or a folder, and generates an image signal that controls display on the projector 60 through the projection controller 103 based on the information regarding the file or folder. The file may be any desired data file such as an image file or a document file. More specifically, the main controller 104, at least partly, operates in cooperation with the projection controller 103 to function as a display controller that controls operation of displaying a projection screen through the projector 60. The list display controller 104a provides the display controller of the projector apparatus 1 with the function of displaying information regarding a data file or a folder stored in the external memory 2 or the file server 3.

Figure 4:
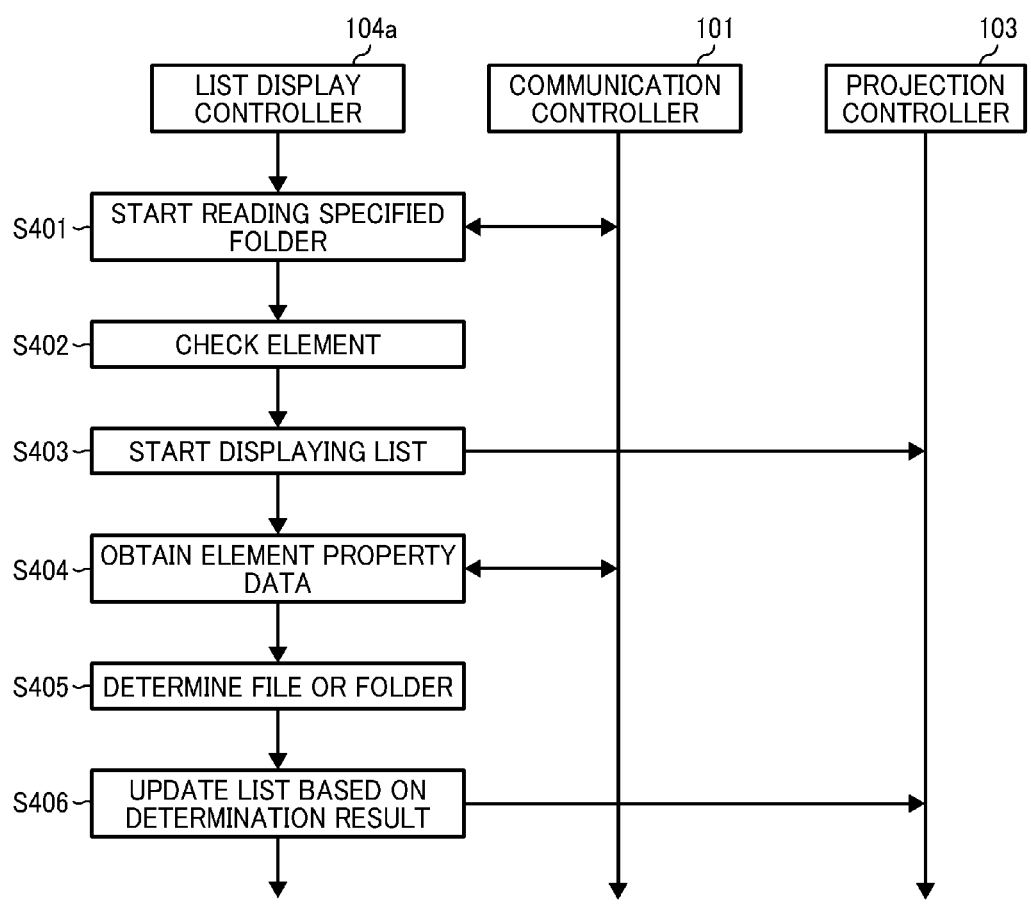
FIG. 4 is a data sequence diagram illustrating operation of displaying a list display screen based on information obtained from an external resource, performed by the projector apparatus of FIG. 1 in cooperation with the external resource, according to an example embodiment of the present invention.

FIG. 4 illustrates a data sequence diagram illustrating operation of displaying a list of files or folders stored in the file server 3, performed by the projector apparatus 1, according to an example embodiment of the present invention. In this example, it is assumed that a user at the projector apparatus 1 specifies one of folders that are stored in a memory area of the file server 3 and instructs the projector apparatus 1 to display one or more files or folders in the specified folder, using the operation device 70.

At S401, the list display controller 104a of the projector apparatus 1 receives folder specific information indicating the specified folder stored in the file server 3, which is input through the operation controller 102. Based on the folder specific information, the list display controller 104a starts reading data from the specified folder stored in the file server 3. More specifically, at S401, the list display controller 104a controls the communication controller 101 to obtain information regarding the specified folder stored in the file server 3, through the network I/F 110 over the network.

At S402, the list display controller 104a determines whether there is any data element indicating a file or a folder in the specified folder, based on the information regarding the specified folder that is obtained at S401. When it is determined that there is a data element indicating a file or a folder, the operation proceeds to S403 to start displaying a list of elements in the specified folder. More specifically, at S403, the list display controller 104a controls the projection controller 103 to cause the projector 60 to display a graphical user interface (GUI), which displays one or more elements in the specified folder.

At S404, the list display controller 104a, which starts displaying a list of elements, obtains property data of the elements included in the specified folder.

At S405, the list display controller 104a determines, for each one of the elements in the specified folder, whether the element indicates a file or a folder to generate a determination result. Further, at S405, when the element is determined to be a folder, the list display controller 104a analyzes the element to determine whether the element has a data file that can be displayed by the projector apparatus 1 to generate an analysis result.

At S406, the list display controller 104a controls the projection controller 103 to update the elements in the specified folder being displayed based on the determination result indicating whether the element is a file or a folder, as well as, the analysis result regarding the folder element.

In this example, the projector apparatus 1 stores a data format information table of FIG. 6 in a memory such as the HDD 40. At S406, the list display controller 104a refers to the data format information table of FIG. 6 to determine whether each element, that is, a file or a folder can be displayed by the projector apparatus 1. The data format information table of FIG. 6 stores compatible data format information indicating one or more data formats from which the display controller implemented by the CPU 10 can generate an image signal of display data for display through the projector 60. More specifically, the data format information table of FIG. 6 stores one or more file extensions, which are compatible with the projector 60 of the projector apparatus 1 such that the main controller 104, which operates in cooperation with the projection controller 103, to function as the display controller is able to generate an image signal to be transmitted to the projector 60 for display as a projection image. Referring to FIG. 6, the data format information table indicates that, for a data file, the file extensions "jpg", "jpeg", "mpg" and "mpeg", etc. are compatible with the display controller of the projector apparatus 1.

Figure 5:
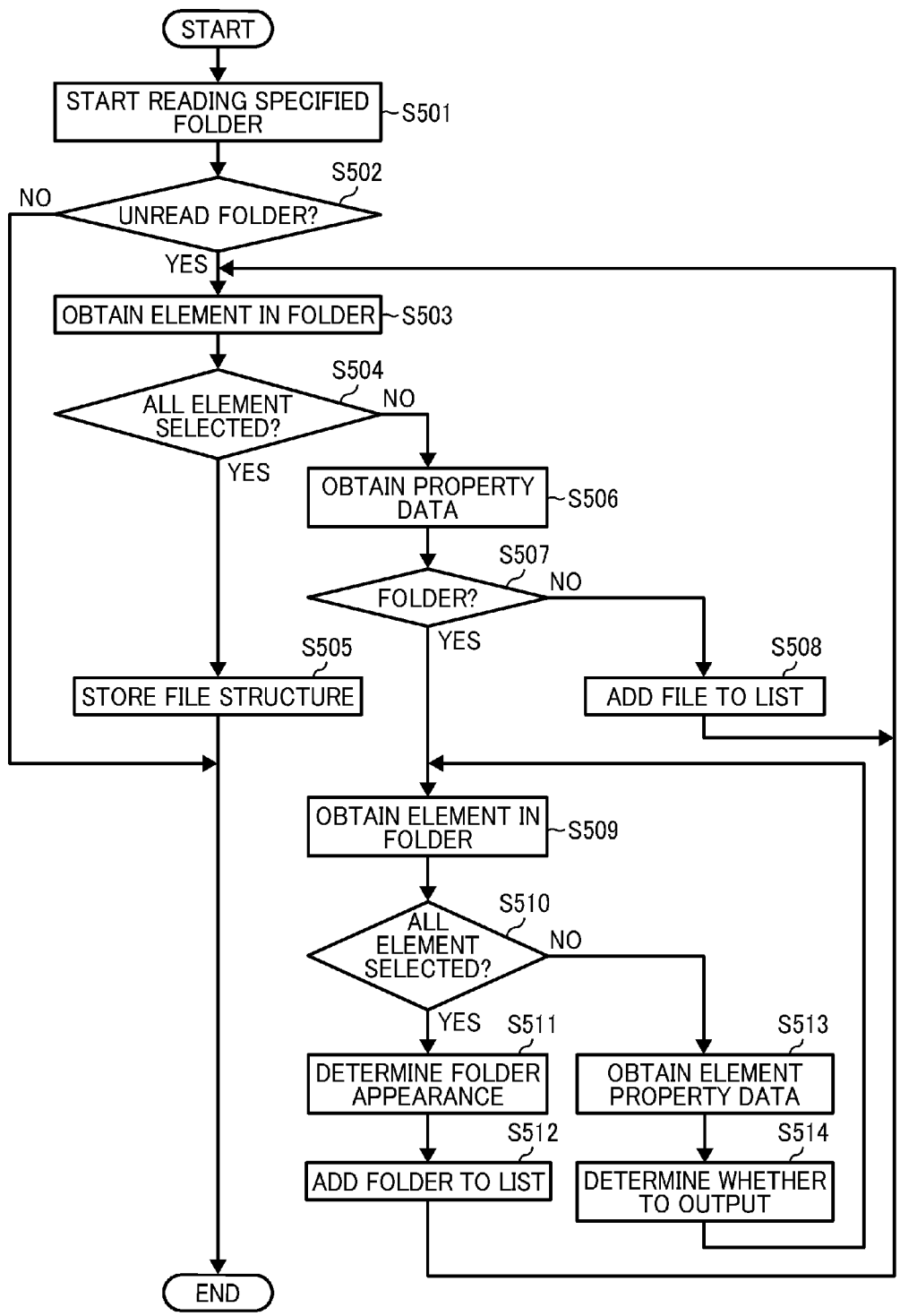
FIG. 5 is a flowchart illustrating operation of displaying a list display screen based on information obtained from the external resource, performed by the projector apparatus of FIG. 1, according to an example embodiment of the present invention.

Referring now to FIG. 5, operation of displaying a list of files or folders stored in the file server 3, performed by the list display controller 104a of the projector apparatus 1, is explained in detail.

At S501, the list display controller 104a receives a user instruction for displaying a list display screen for a specified folder stored in the file server 3. The list display controller 104a starts reading out information from the specified folder stored in the file server 3 through the communication controller 101. The list display controller 104a further displays a list display screen that lists one or more file or folders in the specified folder through the projection controller 103.

At S502, the list display controller 104a determines whether the specified folder, which is specified by the user, is an unread folder that has not been read by the list display controller 104a. When it is determined that the specified folder is the unread folder ("YES" at S502), the operation proceeds to S503.

In this example, the list display controller 104a firstly displays a list display screen according to the user instruction, such that the list display screen may contain no information regarding a file or a folder in the specified folder. As the list display controller 104a performs processing as described below for each one of the elements found in the specified folder, an element indicating a file or a folder contained in the specified folder is added to the list display screen, one by one, until all elements in the specified folder are processed.

More specifically, at S501, the list display controller 104a accesses the file server 3 over the network to obtain a list of elements included in a first layer of the specified folder based on a file system. For example, the list display controller 104a obtains element identification information regarding each element contained in the specified folder as illustrated in FIGS. 7A and 7B, using the file system. Referring to FIG. 7A, when the element is a folder, the element identification information includes a data name for identifying the folder "folder 1", and a data type of the element "folder". Referring to FIG. 7B, when the element is a file, the element identification information includes a data name for identifying the file "picture.jpg", and a data type of the element "file". In this example, the element identification information obtained at S501 for the first layer of the specified folder is referred to as the first element identification information.

At S503, the list display controller 104a selects a file or a folder, which is an element contained in the specified folder. More specifically, the list display controller 104a selects one element, from the list of elements obtained at S501 and are not selected, as a selected element.

At S504, the list display controller 104a determines whether all elements in the specified folder have been selected. When it is determined that all elements are selected such that there is no more unselected element ("YES" at S504), the operation proceeds to S505. When it is determined that all elements are not selected such that there is one or more unselected elements ("NO" at S504), the operation proceeds to S506. More specifically, when selecting one element at S503, the list display controller 104a is able to perform S504 to determine whether one element that is unprocessed is selected at S503.

At S506, for the selected element that is unprocessed, the list display controller 104a obtains property data regarding the selected element from the file server 3 over the network. For example, the list display controller 104a may obtain property data regarding the selected element as illustrated in FIG. 8. Referring to FIG. 8, property data such as the date and time at which data is updated, the creation date and time, and property indicating a type of data is obtained.

At S507, the list display controller 104a determines whether the selected element is a folder or a file. More specifically, the list display controller 104a refers to the data type included in the element identification information (FIGS. 7A and 7B), which is obtained at S501, to determine whether the selected element is a file or a folder. When it is determined that the selected element is a folder ("YES" at S507), the operation proceeds to S509. When it is determines that the selected element is a file ("NO" at S507), the operation proceeds to S508.

At S508, the list display controller 104a controls the projection controller 103 to add the selected file, which is associated with the property data obtained at S506, to the display list screen. Accordingly, the projector 60 displays a list display screen, which additionally includes the selected file together with the property data. The operation then returns to S503 to repeat S503 for another unselected element.

At S509, the list display controller 104a obtains a list of elements contained in the selected folder, from the file server 3 over the network. As described above referring to S501, the list display controller 104a may obtain element identification information, which has a data structure that is substantially the same as the data structure of FIGS. 7A and 7B, using the file system. In this example, the element identification information obtained for the selected folder, which is the second layer of the specified folder, is referred to as the second element identification information. Further, at S509, the list display controller 104a obtains one element from the list of elements contained in the selected folder, as a selected element. For simplicity, the selected element that is selected at S509 may be referred to as the second element, as opposed to the first element selected at S503.

At S510, the list display controller 104a determines whether all second elements in the selected folder are selected, in a substantially similar manner as described above referring to S504. When it is determined that all second elements are selected such that there is no more unselected second element ("YES" at S511), the operation proceeds to S511. When it is determined that all second elements are not selected such that there is one or more unselected second elements ("NO" at S510), the operation proceeds to S513.

At S513, the list display controller 104a obtains, for the selected second element of the selected folder, property data regarding the selected second element from the file server 3 over the network, in a substantially similar manner as described above referring to S506.

At S514, the list display controller 104a refers to the data format information table of FIG. 6 to determine whether the selected second element can be displayed by the projector apparatus 1 to generate an analysis result.

In one example, assuming that the selected second element is a file, at S514, the list display controller 104a refers to the second element identification information to extract an extension of the selected second file from the "data name" of the selected second file. The list display controller 104a further determines whether the extracted extension of the selected second file is included in the "file" field of the data format information table of FIG. 6, as an extension that is compatible with the projector apparatus 1. When the extracted extension is stored in the data format information table of FIG. 6, the list display controller 104a determines that the selected second file can be displayed by the projector apparatus 1. The list display controller 104a determines whether the element is a file or a folder, based on the "data type" of the second element identification information.

In another example, assuming that the selected second element is a folder, at S514, the list display controller 104a refers to the "folder" field of the data format information table of FIG. 6 to determine whether the selected second folder can be displayed by the projector apparatus 1. In this example, the list display controller 104a determines that the folder having any format can be displayed through the projector apparatus 1. The list display controller 104a determines whether the element is a file or a folder, based on the "data type" of the second element identification information.

The analysis result of S514, which indicates whether the second element can be displayed by the projector 60, is stored in a memory area of the RAM 20 in association with information for identifying the second element. The operation returns to S509 to repeat S509 for the next unprocessed second element.

When it is determined that all second elements in the folder are selected and processed at S510, the operation proceeds to S511. At S511, the list display controller 104a refers to the analysis result stored in the memory area of the RAM 20 to determine the appearance of an image representing the selected first folder, such as a display format of the selected file folder when displayed on the list display screen. At S512, the list display controller 104a controls the projection controller 103 to add the selected first folder to the list display screen to update the list display screen with information regarding the selected first folder, and the operation returns to S503 to repeat S503 for the next unprocessed first element.

More specifically, at S511, when the analysis result of S514 indicates that there is at least one second element having a data format compatible with the projector apparatus 1, the list display controller 104a determines the appearance of an image of the selected first folder such that the user can instantly recognize that the selected first folder is selectable. In this example, the list display controller 104a displays the selected first folder, which contains at least one second data file having a data format compatible with the projector apparatus 1, in a regular display format that is set by default.

When the analysis result of S514 indicates that there is no second element having a data format compatible with the projector apparatus 1, the list display controller 104a determines the appearance of an image of the selected first folder such that the user can instantly recognize that the selected first folder is not selectable. For example, the list display controller 104a may display the selected first folder, which contains no second data file having a data format compatible with the projector apparatus 1, in gray out or disabled.

Through operation of FIG. 5, the list display controller 104a analyzes the files or folders in the specified folder, and adds the analyzed files or folders in the determined data format based on the analysis results, one by one, to the list display screen (S508 and S512) to update information in the list display screen. When all of the elements included in the specified folder are processed ("YES" at S504), the operation proceeds to S505. At S505, the list display controller 104a stores information regarding a file structure that reflects the analysis result, in a memory area of the RAM 20 or the HDD (NVRAM) 40, and the operation ends.

At S502, the list display controller 104a determines whether the specified folder, specified by the user, is the unread folder. More specifically, the list display controller 104a determines whether information regarding a file structure of the specified folder is stored in the memory area. When it is determined that the information regarding the file structure of the specified folder is stored ("NO"), the list display controller 104a controls the projection controller 103 to display a list of elements based on the stored file structure, and the operation ends.

Figures 9, 10, 11:
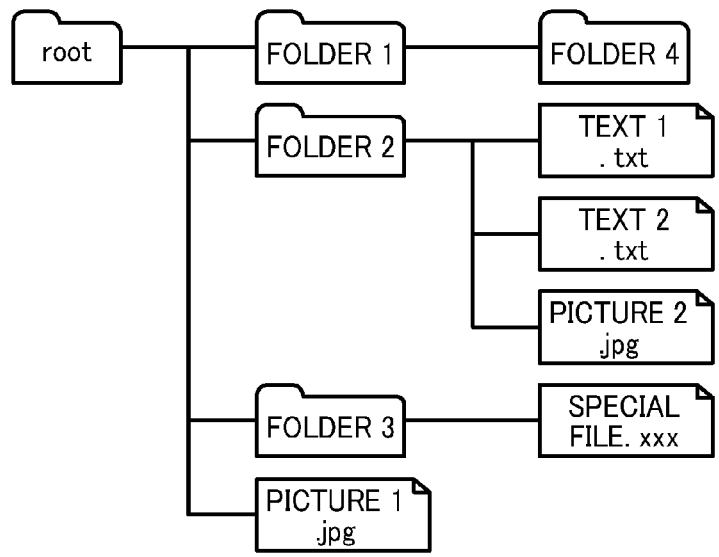
FIG. 9 is an illustration for explaining a tree structure of a folder.
FIG. 10 is an example data structure of a display format analysis table, managed by the projector apparatus of FIG. 1.
FIG. 11 is an example list display screen, which displays contents of the folder of FIG. 9.

Referring now to FIGS. 9 to 11, one example of displaying one or more elements in the specified folder, which is described above referring to FIG. 5, is illustrated. FIG. 9 illustrates a file structure of a specified folder "root" that is specified by the user, which contains a plurality of elements. More specifically, the "root" folder contains three folders "folder 1", "folder 2", and "folder 3", and an image file "image1.jpg", in the first layer of structure.

The "folder 1" contains a "folder 4". The "folder 2" contains a plurality of files "text1.txt", "text2.txt", and "image2.jpg". The "folder 3" contains a file "special file.xxx", which has an application specific data format.

Assuming that the projector apparatus 1 displays a list display screen according to a user instruction for specifying the "root" file for display, the list display controller 104a performs operation of FIG. 5 to determine a display format of each folder or file in the "root" folder. Since the "folder 1" contains the "folder 4", the list display controller 104a determines that the "folder 1" can be displayed at S514 to generate an analysis result. Based on this analysis result, the list display controller 104 selects a normal display format for the "folder 1" at S511. This analysis result indicating that the display format is a default display format is stored, for example, in the form of table as illustrated in FIG. 10. Referring to FIG. 10, for the "folder 1", the display format is unchanged.

For the "folder 2", which stores the "image2.jpg" having a data format compatible with the projector apparatus 1, the list display controller 104a determines that the "folder 2" is to be displayed with a normal display format. Referring to FIG. 10, for the "folder 2", the display format is unchanged.

For the "folder 3", which stores the "special file.xxx" having a data format not compatible with the projector apparatus 1, the list display controller 104a determines that the "folder 3" is to be displayed with a grayout display format. Referring to FIG. 10, for the "folder 3", the display format is changed, from the normal display format to the grayout display format.

The "image1.jpg" file, which is determined to be the file at S507, is added to the list display screen at S508. In this example, the "image1.jpg", which has a data file compatible with the projector apparatus 1, is displayed in a normal display format. Referring to FIG. 10, for the "image1.jpg", the display format is unchanged.

As illustrated in FIG. 10, for the "root" folder of FIG. 9, the list display controller 104a determines that only the "folder 3" is displayed in grayout to indicate that the "folder 3" is not selectable. Based on this analysis result, the list display controller 104a instructs the projection controller 103 to change the appearance of an image reflecting the "folder 3" such that the "folder 3" is displayed in grayout, as illustrated in FIG. 11. In FIG. 11, the dashed line indicates that the "folder 3" is displayed in grayout.

As described above, the "folder 3" only stores a file having a data format that is not compatible with the projector apparatus 1 such that the projector apparatus 1 is not able to display an image of the file in the "folder 3" on the screen. In such case, even when the user selects the "folder 3" being displayed on the screen through the operation device 70, the projector apparatus 1 may return an error or displays no image in the folder 3. As long as the "folder 3" is displayed in grayout to indicate that the "folder 3" is unelectable, the user is discouraged from selecting the "folder 3".

The "folder 1" storing the "folder 4" is displayed in a manner substantially similar to the other folder storing a data file having a data format compatible with the projector apparatus 1. In this manner, when a folder has a folder in the lower layer, the user can instantly know that the folder is accessible, as such folder is displayed with a normal display format.

More specifically, when the projector apparatus 1 receives a user instruction for displaying the contents of a specified folder on a screen through the projector 60, the projector apparatus 1 determines whether the specified folder includes any file having a data format compatible with the projector apparatus 1. When it is determined that the specified folder has no file having a data format compatible with the projector apparatus 1, the projector apparatus 1 determines that the folder is to be displayed such that it is not selectable by the user. Since the appearance of an image reflecting the folder being displayed is determined based on whether the folder has a file that can be displayed by the projector apparatus 1, the user can instantly know, by visually checking the image of the folder being displayed on the screen, any folder that contains no data to be displayed. This improves user operability as the user is discouraged from selecting a folder having no data to be displayed by the projector apparatus 1.

Further, when the projector apparatus determines that the specified folder has a folder in the lower layer, the projector apparatus 1 determines that the folder is to be displayed such that it is selectable by the user, as described in case of the "folder 1". Since the appearance of an image reflecting the folder being displayed is further determined based on whether the folder has a folder that can be displayed by the projector apparatus 1, the user can instantly know, by visually checking the image of the folder being displayed on the screen, any folder that contains no data to be displayed. This improves user operability as the user is discouraged from selecting a folder having no data to be displayed by the projector apparatus 1.

Further, as described above, the projector apparatus 1, which obtains information regarding a file structure of a specified folder, stores such information regarding the file structure of the specified folder. As described above referring to S502, the projector apparatus 1 determines whether the information regarding the file structure of the specified folder is stored. With this step, in case the projector apparatus 1 receives an instruction for displaying the specified folder that has been previously read by the projector apparatus 1, the projector apparatus 1 does not have to perform again the operation of FIG. 5. The information regarding the file structure of the specific folder includes analyzed folder path information, and the analysis result regarding the display format of each folder. The analyzed folder path information indicates a path of the specified folder that has been analyzed by the projector apparatus 1. In alternative to the analyzed folder path information, the projector apparatus 1 may store any other identification information that uniquely identifies the specified folder that has been analyzed by the projector apparatus 1. Using the identification information of the specified folder, the projector apparatus 1 obtains the analysis result indicating the display format of each folder in the specified folder, and causes the projection controller 103 to display each folder in the determined display format.

In the above-described example of FIG. 5, when the specified folder further contains a folder in the lower layer ("the first element" or "the first folder"), at S509, the list display controller 104a selects one element ("the second element") contained in the first folder to obtain second element identification information from the file server 3 or the external memory 2, as described above referring to FIGS. 7A and 7B.

At S513, the list display controller 104a further obtains property data regarding the selected second element in the first folder from the file server 3 or the external memory 2, as described above referring to FIG. 8. In order to further reduce the processing load on the list display controller 104a, S513 of obtaining the property data does not have to be performed for the second element, as the property data obtained for the selected element in the first folder is not used to display information regarding the specified folder.

When S513 is omitted from the operation of FIG. 5, the list display controller 104a stores folder path information regarding the specified folder, and folder path information regarding the first folder in the specified folder, in a manner such that each folder can be uniquely identified. With the folder path information, the list display controller 104a is able to recognize whether the list display controller 104a selects an element from the specified folder or the first folder. Based on the folder path information, the list display controller 104a determines whether to obtain property data using the file system.

Even when S513 is not performed, at S514, the list display controller 104a is able to determine a display format of each first folder in the specified folder, based on the second element identification information obtained at S509.

Further, in the above-described example of FIG. 5, the list display controller 104a repeats operation of S509, S510, S513, and S514 until all of the second elements in the first folder in the specified folder are analyzed to determine a display format of each first folder in the specified folder at S511.

In alternative to analyzing all of the second elements in the selected first folder, the list display controller 104a may determine whether the first folder contains at least one data file that can be displayed by the projector apparatus 1, and determines whether to perform operation of S509, S510, S513, and S514, based on the determination result. As long as the lower layer folder, i.e., the first folder has at least one data file that can be displayed by the projector apparatus 1, the list display controller 104a determines to display the lower layer folder in a normal display format. In such case, the list display controller 104a does not have to repeat S509, S510, S513, and S514 for the rest of folders or files being stored in the lower layer folder.

Figure 12:
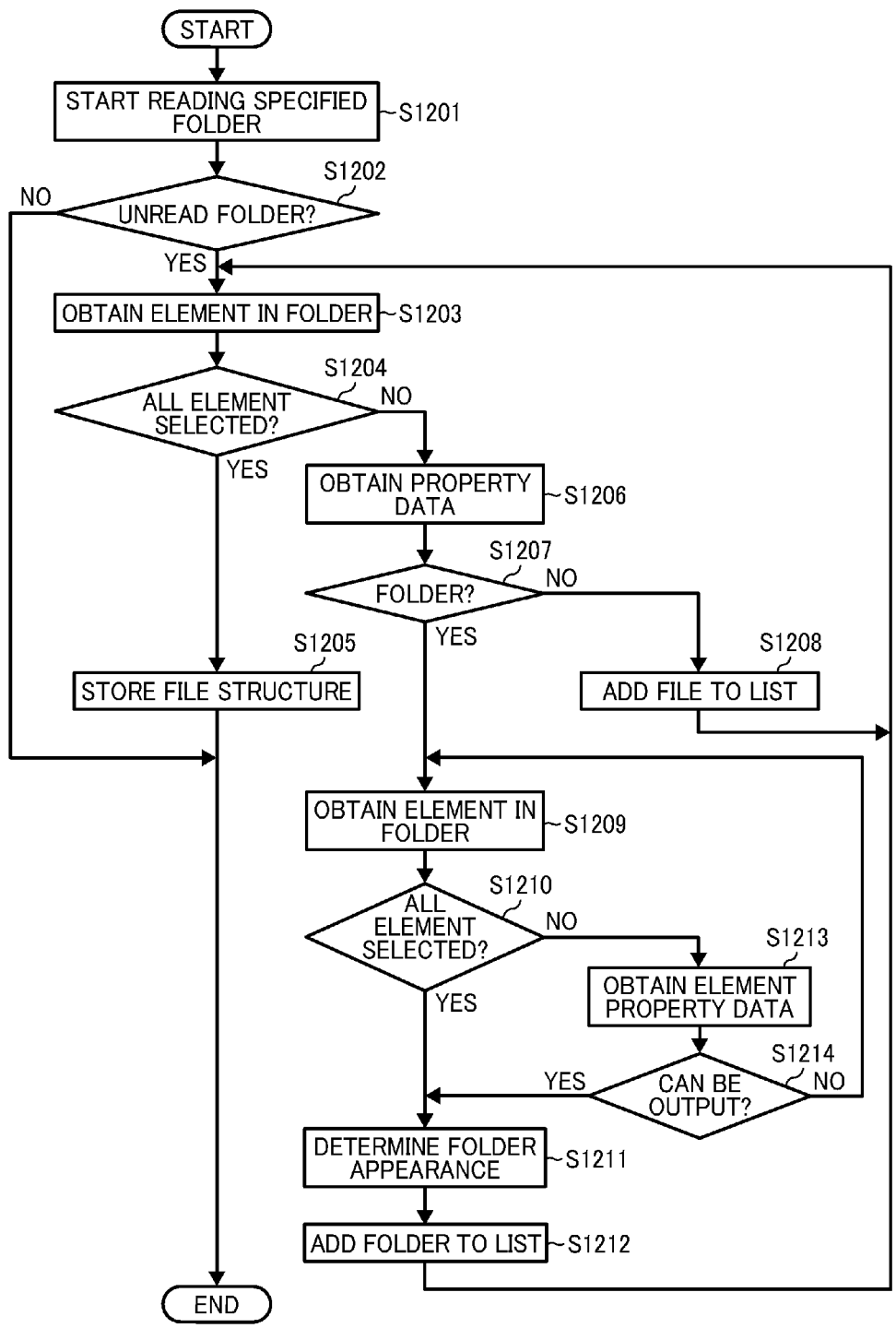
FIG. 12 is a flowchart illustrating operation of displaying a list display screen based on information obtained from the external resource, performed by the projector apparatus of FIG. 1, according to an example embodiment of the present invention.

FIG. 12 is a flowchart illustrating operation of displaying a list of files or folders stored in the file server 3, performed by the list display controller 104a of the projector apparatus 1, according to an example embodiment of the present invention. The operation of FIG. 12 is performed in a substantially similar manner as described above referring to FIG. 5, except for the differences. The differences include the addition of S1214.

At S1214, the list display controller 104a determines whether the selected element has a data format compatible with the projector apparatus 1, such that the selected element can be output through the projector 60. When it is determined that the selected element has a data element compatible with the projector apparatus 1 ("YES" at S1214), the operation proceeds to S1211 to determine that the selected folder is to be displayed in a normal display format. When it is determined that the selected element does not have a data element compatible with the projector apparatus 1 ("NO" at S1214), the operation returns to S1209 to repeat S1209 for a newly selected element.

As described above, the list display controller 104a determines to display the selected folder in a normal display format, as long as the selected folder has at least one element having a data format that is compatible with the projector apparatus 1. Through performing operation of FIG. 12, the processing load required for analyzing whether a specific folder or file has a data format that can be displayed by the projector apparatus 1 can be greatly reduced.

Further, in the above-described example of FIG. 5 or FIG. 12, the list display controller 104a causes the projection controller 103 to firstly display a list display screen having no information, according to a user instruction for selecting the specified folder. As the list display controller 104a performs S508 (S1208) and S512 (S1212), the list display screen is updated with information obtained through performing S508 (S1208) and S512 (S1212). When there are many elements in the lower layer folder, it would take longer for the projection controller 103 to obtain an analysis result for each element in the specified folder, such that the list display screen remains unchanged for the longer time period. In view of this, the list display controller 104a may cause the projection controller 103 to display all elements in the specified folder, based on the first element identification information obtained at S501 (S1201) as the list display controller 104a starts reading out information regarding the specified folder. In such case, since the analysis result indicating a display format of the first element is not yet obtained, the list display controller 104a may cause the projection controller 103 to display the first elements in the specified folder, with notification indicating that the first elements are not analyzed. For example, as illustrated in FIGS. 13A and 13B, the projection controller 103 may display each folder, with an image indicating that the folder is not analyzed.

Referring to FIG. 13A, the list display controller 104a causes the projection controller 103 to display a list display screen of FIG. 13A, right after the list display controller 104a starts reading out information from the specified folder. In FIG. 13A, for any element that is not analyzed, a mark representing a hourglass is displayed. With this mark, the user can instantly recognize that a display format is not determined for the element, such that the user is discouraged from selecting that element as data to be displayed is not ready yet.

As long as the display format is determined for the element being displayed with the hourglass mark, the list display controller 104a causes the projection controller 103 to display that element in the determined display format. For example, as illustrated in FIG. 13B, when the list display controller 104a completes determination of a display format for the folder 1 and the folder 2, the projection controller 103 switches the list display screen of FIG. 13A to the list display screen of FIG. 13B. In FIG. 13B, in alternative to displaying the hourglass mark, the folder 1 and the folder 2 are respectively displayed in the determined display formats.

In the example described above referring to FIGS. 13A to 13B, the projector apparatus 1 firstly displays a list display screen that lists one or more folders or files, in the specified folder, based on element identification information obtained from the external resource, without waiting for the list display controller 104a to determine a display format of each folder or file. Accordingly, the projector apparatus 1 is able to at least display information regarding one or more files or folders contained in the specified folder, even when there are a large number of files or folders to be analyzed in the specified folder. This may discourage the user from requesting the projector apparatus 1 to display information regarding the other folder, while waiting for information regarding the specified folder to be displayed.

In the above-described example referring to FIGS. 5 and 12, the projector apparatus 1 determines a display format of each folder, based on the extension extracted from the data name of the file stored in the folder. In some cases, making determination based on the extension of the file name may not be accurate. For example, the extension of the file name that is actually added may differ from the extension to be added to the file name by default. Even when the extension of the file name that is actually added matches with the extension to be added to the file name by default, the actual data structure of the file may differ from a data structure that is expected.

In view of this, at S514 of FIG. 5, or at S1214 of FIG. 12, the list display controller 104a may analyze header information of the selected file to determine a data format of the selected file. The list display controller 104a determines whether the extracted data format of the selected file is a data format that is compatible with the projector apparatus 1. As the header information of the selected file contains accurate information regarding an actual data format of the file, the list display controller 104a is able to determine a display format of the file with improved accuracy.

More specifically, the projector apparatus 1 stores a data format information table of FIG. 14 in a memory such as the HDD 40, in alternative to the data format information table of FIG. 6. Referring to FIG. 14, the data format information table stores one or more data formats that are compatible with the projector apparatus 1, and one or more file extensions that are compatible with the projector apparatus 1, in association with each other. Using the data format information table of FIG. 14 and the data format of the element, the list display controller 104a determines whether the element can be displayed by the projector apparatus 1.

Further, in the above-described example of FIGS. 5 and 12, the list display controller 104a displays the lower layer folder, which contains at least one data file that can be displayed or at least one folder, in a normal display format. The list display controller 104a displays the lower layer folder, which contains none of a data file that can be displayed nor a folder, in a grayout display format. While the user can instantly recognize that the folder, which is grayout, is not selectable, the user is not able to know the reason why the folder is not selectable.

Further, even when the folder is displayed in the normal display format, there are mainly two cases including a first case in which the folder contains a data file that can be displayed, and a second case in which the folder contains a folder in the lower layer. In such case, the user is not able to distinguish between these two different cases, as the folder is displayed in the normal display format for both of the cases.

Figures 15, 16, 17:
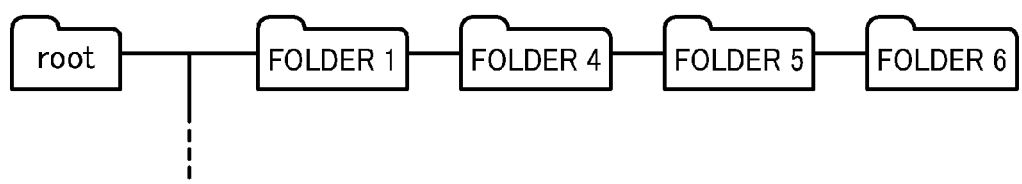
FIG. 15 is an example data structure of a display format information table, managed by the projector apparatus of FIG. 1.
FIG. 16 is an example list display screen, which displays contents of the folder of FIG. 9.
FIG. 17 is an illustration for explaining a tree structure of a folder.

In view of this, in alternative to displaying the folder in the normal display format or the grayout format, the list display controller 104a may set more than two display formats based on the analysis result of each folder. For example, the projector apparatus 1 may store a display format information table of FIG. 15 in a memory such as the HDD 40. Referring to FIG. 15, the display format information table of FIG. 15 stores information indicating the analysis result of a folder ("folder analysis result"), and information indicating a display format of the folder having the analysis result, in association with each other ("display settings").

It is assumed that the list display controller 104a performs operation of FIG. 5 for the specified folder "root" of FIG. 9, based on the display format information table of FIG. 15. In such case, for the folder 1, the list display controller 104a generates an analysis result indicating that the folder 1 only contains the folder 4. Based on this analysis result, the list display controller 104a refers to the display format information table of FIG. 15 to determine that the exclamation mark is to be displayed for the folder 1. Accordingly, as illustrated in FIG. 16, the folder 1 is displayed with the exclamation mark.

For the folder 2, the list display controller 104a generates an analysis result indicating that the folder 2 contains at least a data file having a data format compatible with the projector apparatus 1. Based on this analysis result, the list display controller 104a refers to the display format information table of FIG. 15 to determine that the folder 2 is to be displayed in a normal display format. Accordingly, as illustrated in FIG. 16, the folder 2 is displayed in the normal display format.

For the folder 3, the list display controller 104a generates an analysis result indicating that the folder 3 only contains a data file having a data format that is not compatible with the projector apparatus 1. That is, the folder 3 contains no data file having a data format compatible with the projector apparatus 1. Based on this analysis result, the list display controller 104a refers to the display format information table of FIG. 15 to determine that the folder 3 is to be displayed in a grayout format. Accordingly, as illustrated in FIG. 16, the folder 3 is displayed in the grayout format.

In case the folder "root" includes any folder having no data stored therein, the list display controller 104a generates an analysis result indicating that the folder contains no data file, and displays that folder in a blackout display format. With the blackout display format, white color and black color of an image of the folder are inversely displayed. With this appearance, the user can instantly recognize that the folder contains no data.

As described above referring to FIGS. 15 and 16, the projector apparatus 1 is able to display a list display screen with detailed information regarding the lower layer folder in the specified folder, to carry out detailed information for the user.

In the above-described examples referring to FIGS. 5 and 12, when the lower layer folder contains only a folder, the list display controller 104a controls the projection controller 103 to display the lower layer folder in a normal display format. In the above-described example referring to FIGS. 15 and 16, when the lower layer folder contains only a folder, the list display controller 104a controls the projection controller 103 to display the lower layer folder in the normal display format with the exclamation mark. In some cases, however, the folder may only contain a plurality of folders in a plurality of layers as illustrated in FIG. 17. In such case, the folder 6 may contain no data file or may only contain a data file having a data format that is not compatible with the projector apparatus 1. In such case, all the processes for determining the respective display formats of the folders 1 to 5 would be wasted.

In view of this, after S509 of FIG. 5 or S1209 of FIG. 12, the list display controller 104a may analyze lower layer folders in the second folder, when the second folder does not have a data file having a data format compatible with the projector apparatus 1, but has a lower layer folder. More specifically, the list display controller 104a may perform operation of FIG. 18.

S1801 to S1807 are performed in a substantially similar manner as described above referring to S501 to S507 of FIG. 5. At S1807, when it is determined that the selected first folder has the second folder in the lower layer ("YES" at S1807), the operation proceeds to S1809. At S1809, the list display controller 104a analyzes the second folder as described below referring to FIG. 19. Based on the analysis result of S1809, at S1810, the list display controller 104a determines a display format of the selected first folder.

Figure 18:
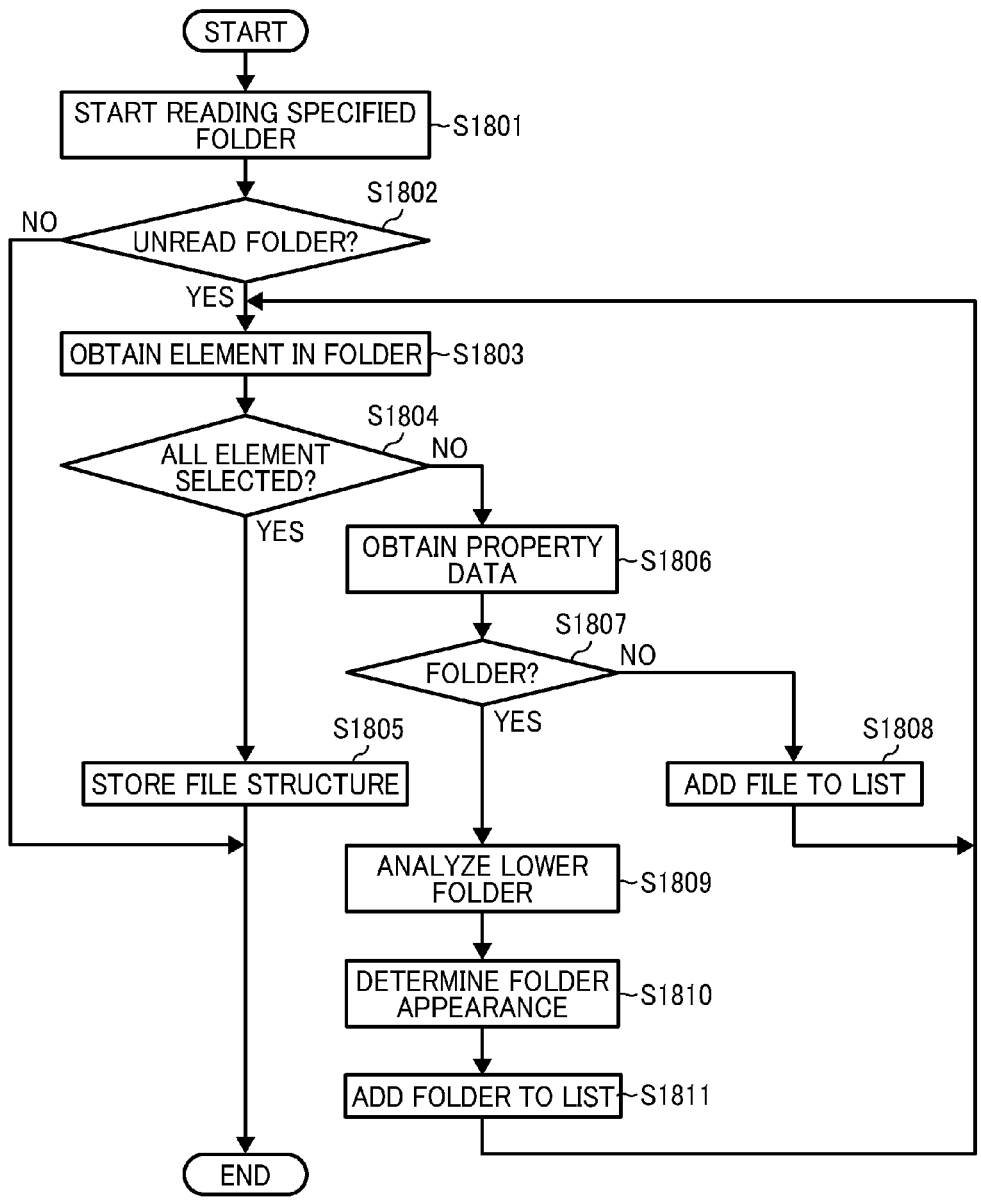
FIG. 18 is a flowchart illustrating operation of displaying a list display screen based on information obtained from the external resource, performed by the projector apparatus of FIG. 1, according to an example embodiment of the present invention.
Figure 19:
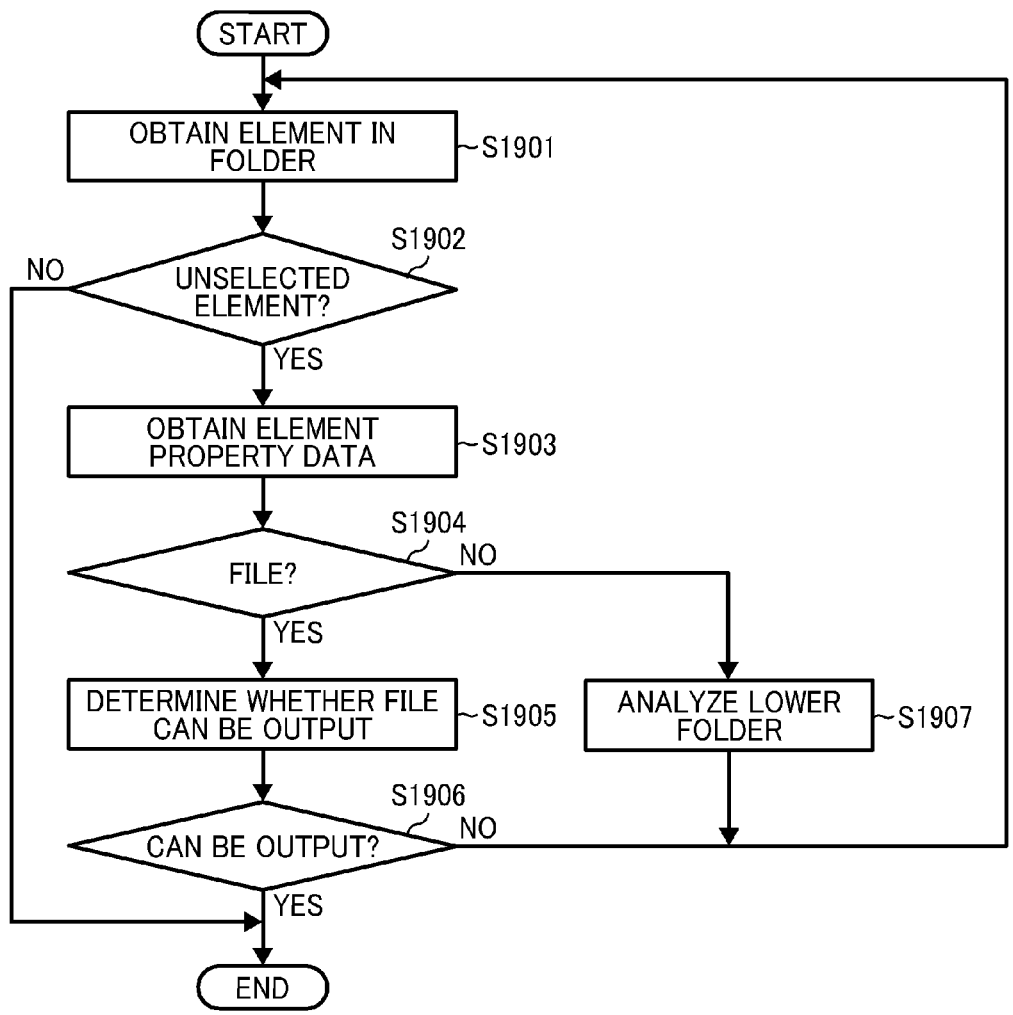
FIG. 19 is a flowchart illustrating operation of analyzing a folder, performed by the projector apparatus of FIG. 1, according to an example embodiment of the present invention.

FIG. 19 is a flowchart illustrating operation of analyzing the second folder in the lower layer of the first folder, performed by the list display controller 104a at S1809 of FIG. 18, according to an example embodiment of the present invention.

At S1901, the list display controller 104a selects one element from one or more elements in the second folder. More specifically, at S1901, the list display controller 104a obtains element identification information for identifying each element in the second folder, as illustrated in FIGS. 7A and 7B. For simplicity, the element contained in the second folder is referred to as the third element.

At S1902, the list display controller 104a determines whether there is at least one unselected third element in the second folder. When it is determined that at least one third element that is not selected ("YES" at S1902), the operation proceeds to S1903. When it is determined that all third elements are selected such that there is no more unselected third elements ("NO" at S1902), the operation ends.

At S1903, the list display controller 104a obtains property data regarding the selected third element, from the external resource such as the file server 3, in a substantially similar manner as described above referring to FIG. 8.

At S1904, the list display controller 104a determines whether the selected third element is a folder or a file. More specifically, the list display controller 104a refers to the data type included in the third element identification information (FIGS. 7A and 7B), which is obtained at S1901, to determine whether the selected third element is a file or a folder. When it is determined that the selected third element is a file ("YES" at S1904), the operation proceeds to S1905. When it is determined that the selected third element is a folder ("NO" at S1904), the operation proceeds to S1907.

At S1095, the list display controller 104a determines whether the file, which is the third element, has a data format compatible with the projector apparatus 1 in a substantially similar manner as described above referring to S514 of FIG. 5, to generate an analysis result.

At S1906, the list display controller 104a further determines whether the selected second folder has a data file that can be displayed based on the analysis result of the third element, in a substantially similar manner as described above referring to S1214 of FIG. 12. When it is determined that the selected second folder has a data file with a data format compatible with the projector apparatus 1 ("YES" at S1906), the operation ends. In such case, the operation further proceeds to S1810 of FIG. 18 to determine that the first folder is to be displayed in the normal display format.

At S1906, when it is determined that the selected second folder has a data file with a data format not compatible with the projector apparatus 1 ("NO" at S1906), the operation returns to S1901 to repeat S1901 for a next selected third element. At S1906, the list display controller 104a stores an analysis result indicating that the selected second folder has no data file having a data format compatible with the projector apparatus 1.

At S1904, when it is determined that the selected third element in the second folder is the folder ("NO" at S1904), the operation proceeds to S1907. At S1907, the list display controller 104a performs operation of FIG. 19 to analyze one or more elements, in the lower layer of the third element.

For the third folder, the list display controller 104a selects one fourth element from one or more fourth elements in the third folder. This operation is thus repeated for all lower layer folders. At S1902, assuming that there is no element that is not processed ("NO" at S1902), the operation ends. In such case, the list display controller 104a generates an analysis result indicating that there is no data file having a data format compatible with the projector apparatus 1. Based on this analysis result, at S1810, the list display controller 104a determines to display the lower layer folder in a grayout display format.

As described above referring to FIGS. 18 and 19, throughout performing operation of analyzing the lower layer folder of FIG. 19, the projector apparatus 1 is able to generate a determination result with respect to a display format of the folder, with improved efficiency.

Numerous additional modifications and variations are possible in light of the above teachings. It is therefore to be understood that within the scope of the appended claims, the disclosure of the present invention may be practiced otherwise than as specifically described herein.

For example, in the above-described examples, the projector apparatus 1 that projects an image is described as one example of image output apparatus. The above-described operation of determining a display format of a folder and displaying the folder in the determined display format is applicable to any desired image output apparatus. For example, the image output apparatus may be implemented by a liquid crystal display (LCD) apparatus or an electronic board display apparatus, which outputs an image based on the image signal.

Further, in any one of the above-described examples, it is assumed that the display controller 104a generate data of a list display screen, which lists one or more images each reflecting a specific element in the specified folder. Alternatively, one or more elements in the specified folder may be displayed in various other ways, for example, as one or more icons with or without property data according to the user preference. Further, one or more elements in the specified folder may be arranged in any desired order, for example, by data file name or data file size.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image output apparatus that outputs an image based on an image signal generated from image data. The image output apparatus includes a list display controller to generate display data, which causes a display to display a list display screen that lists contents of a specific folder, and a display controller that generates an image signal based on the display data generated by the list display controller. The list display controller obtains first element identification information for identifying a first element in the specified folder, and determines whether the first element is a folder based on the first element identification information. When the first element is determined to be the folder, the list display controller obtains second element identification information for identifying a second element in the first element, and determines whether the second element has a data format compatible with the image signal to be generated by the display controller, based on data format information indicating a data format of data from which the display controller can generate the image signal, to generate an analysis result. The list display controller determines a display format of the folder having the second element based on the analysis result, such that the first element is displayed in the determined format on the list display screen.

In another example, when the first element is determined to be the folder, the list display controller determines the display format of the first element to be displayed on the list display screen, based on information that associates an analysis result indicating whether the second element stored in the first element is compatible with the image signal to be generated by the display controller, with a display format of the first element to be displayed on the list display screen.

In another example, after the first element identification information is obtained but before determining the display format of the first element on the list display screen, the list display controller generates the display data that includes information indicating that the data format of the first element is to be determined. When the analysis result of the second element is generated, the list display controller updates the display format of the first element based on the analysis result.

In another example, when the first element is determined to be the folder and when the second element includes a plurality of second elements, the list display controller analyzes the plurality of second elements, one by one, to generate a plurality of analysis results. When the second element has the analysis result indicating that the second element is a data file having a data format compatible with the image signal generated by the display controller, the list display controller determines the display format of the first element determined to be the folder, without analyzing the other second element.

In another example, the list display controller stores the determination result indicating the determined display format of the first element in the specified folder in a memory in association with information for identifying the specified folder. When a user instruction for specifying the specified folder is received, the list display controller generates the display data based on the determination result stored in the memory.

In another example, the list display controller obtains header information of the second element, and determines whether the second element has a data format compatible with the image signal to be generated by the display controller based on the header information.

In another example, the list display controller obtains property data of the first element to be displayed on the list display screen, but not obtains property data of the second element.

In another example, when the second element is determined to be a folder, the list display controller determines whether an element included in the second element has a data format compatible with the image signal to be generated by the display controller for all layers including the lowest layer of the second element to generate an analysis result. Based on the analysis result, the list display controller determines the display format of the folder including the second element.

In one example, the present invention may reside in a method of controlling an image output apparatus that outputs an image based on an image signal generated from image data. The image output apparatus includes a list display controller to generate display data, which causes a display to display a list display screen that lists contents of a specific folder, and a display controller that generates an image signal based on the display data generated by the list display controller. The method includes: obtaining first element identification information for identifying a first element in the specified folder; determining whether the first element is a folder based on the first element identification information; when the first element is determined to be the folder, obtaining second element identification information for identifying a second element in the first element; determining whether the second element has a data format compatible with the image signal to be generated by the display controller, based on data format information indicating a data format of data from which the display controller can generate the image signal, to generate an analysis result; and determining a display format of the folder having the second element based on the analysis result, such that the first element is displayed in the determined format on the list display screen.

In one example, the present invention may reside in a program stored in a recording medium, which controls an image output apparatus that outputs an image based on an image signal generated from image data. The image output apparatus includes a list display controller to generate display data, which causes a display to display a list display screen that lists contents of a specific folder, and a display controller that generates an image signal based on the display data generated by the list display controller. The method includes: obtaining first element identification information for identifying a first element in the specified folder; determining whether the first element is a folder based on the first element identification information; when the first element is determined to be the folder, obtaining second element identification information for identifying a second element in the first element; determining whether the second element has a data format compatible with the image signal to be generated by the display controller, based on data format information indicating a data format of data from which the display controller can generate the image signal, to generate an analysis result; and determining a display format of the folder having the second element based on the analysis result, such that the first element is displayed in the determined format on the list display screen.

In one example, the present invention may reside in: an image output apparatus including: a processing circuit that generates an image signal of display data, in response to a user instruction for displaying information regarding a folder specified by a user, the specified folder being stored in a memory; and a display that displays an image based on the image signal of the display data. The processing circuit functions as the display controller, which is implemented by the list display controller 104a and the projection controller 103, in one example. The display may be implemented by the projector 60. The image output apparatus may access a memory to obtain information regarding the specified folder, which may be provided inside or outside the image output apparatus.

The processing circuit obtains first element identification information for identifying a first element included in the specified folder from the memory, and determines whether the first element is a folder based on the first element identification information. For example, the processing circuit may refer to the element type field of the first element identification information.

When the first element is determined to be the folder, the processing circuit further obtains second element identification information for identifying a second element included in the first element from the memory, and analyzes whether the second element is a data file having a data format compatible with the display to generate an analysis result, using compatible data format information indicating one or more data formats from which the processing circuit can generate an image signal of display data. For example, the processing circuit may obtain a file extension from the second element identification information, and determines whether the file extension is indicated by the compatible data format information. In another example, the processing circuit may obtain a data format of the second element from the memory, and determines whether the data format is indicated by the compatible data format information.

The processing circuit determines a display format of the first element that is determined to be the folder based on the analysis result of the second element, and generates first display data that causes the display to display an image that reflects the first element in the determined display format. For example, when the analysis result indicates that the second element is a data file having a data format compatible with the display, the first element is displayed in a default display format. When the analysis result indicates that the second element is not a data file having a data format compatible with the display, the first element is displayed in a display format different from the default display format.

The analysis result of the second element may further indicate whether the second element is a folder. When the analysis result indicates that the second element is a folder, in one example, the processing circuit determines that the first element is displayed in the default display format. When the analysis result indicates that the second element is a folder, in another example, the processing circuit determines whether the second element includes a lower layer folder, and analyzes the lower layer element to determine whether any lower layer element is a data file having a data format compatible with the display to generate an analysis result.

The analysis result of the second element may further indicate whether the second element contains not data. In case of having no data in the second element, the processing circuit determines that the first element is displayed in a display format different from the default display format.

The processing circuit refers to a memory, which stores display format information that associates a display format of the first element, with an analysis result that at least indicates whether the second element is a data file having a data format compatible with the display. For example, a plurality of types of analysis results may be stored in association with a plurality of types of display formats of the first element.

What is claimed is:

1. An image output apparatus, comprising:
a processing circuit configured to generate an image signal of display data, in response to a user instruction for displaying information regarding a folder specified by a user, the specified folder being stored in a memory; and
a display configured to display an image based on the image signal of the display data, wherein the processing circuit is configured to:
obtain first element identification information for identifying a first element included in the specified folder from the memory;
determine whether the first element is a folder based on the first element identification information;
obtain second element identification information for identifying a second element included in the first element from the memory, when the first element is determined to be the folder;
analyze whether the second element is a data file having a data format compatible with the display to generate an analysis result, using compatible data format information indicating one or more data formats from which the processing circuit can generate an image signal of display data;
determine a display format of the first element that is determined to be the folder based on the analysis result of the second element; and
generate first display data, which causes the display to display an image that reflects the first element in the determined display format.

2. The image output apparatus of claim 1, wherein the memory is configured to store display format information that associates a display format of the first element with an analysis result that at least indicates whether the data format of the second element is compatible with the display,
wherein, when the first element is determined to be the folder, the processing circuit determines the display format of the first element, using the display format information stored in the memory.

3. The image output apparatus of claim 1, wherein the processing circuit is further configured to:
generate second display data, which causes the display to display an image that reflects the first element identified by the first element identification information in a default display format, with information indicating that a display format of the first element has not yet been determined, before displaying the image based on the first display data; and
instruct the display to switch display from the image generated based on the second display data, to the image generated based on the first display data, such that the image that reflects the first element is displayed in the determined display format when the display format is determined.

4. The image output apparatus of claim 1, wherein, when the second element includes a plurality of elements in one or more lower layers, the processing circuit is further configured to:
analyze the plurality of lower layer elements, one by one, until the processing circuit determines that at least one of the plurality of lower layer elements has the analysis result indicating that the lower layer element is a data file having a data format compatible with the display; and
determine the display format of the first element based on the analysis result of the lower layer element included in the second element.

5. The image output apparatus of claim 1, wherein the processing circuit is further configured to:
store the analysis result of the second element in the memory in association with specified folder identification information for identifying the specified folder, and
generate the first display data based on the analysis result of the second element that is obtained from the memory, in response to a user instruction for instructing display of information regarding the specified folder.

6. The image output apparatus of claim 1, wherein the processing circuit obtains header information of the second element, and determines whether the second element is a data file having a data format compatible with the display based on the header information.

7. The image output apparatus of claim 1, wherein the processing circuit is further configured to:
   obtain property data regarding only the first element to cause the first display data to additionally include the property data of the first element for display.

8. The image output apparatus of claim 1, wherein, when the second element is determined to be a folder, the processing circuit analyzes whether the second element includes at least one third element that is a data file having a data format compatible with the display to generate an analysis result of the third element, and determines the display format of the first element based on the analysis result of the third element.

9. The image output apparatus of claim 1, wherein, when the analysis result indicates that the first element does not include any second element that is a data file having a data format compatible with the display, the processing circuit determines the display format of the first element such that the first element is displayed in a format that is not selectable by a user.

10. The image output apparatus of claim 1, wherein the display is a projector that projects the image based on the image signal of the display data on a projection surface.

11. An image output system, comprising:
   the image output apparatus of claim 1; and
   a server apparatus connected to the image output apparatus through a network, wherein the server apparatus is configured to provide a data area that functions as the memory from which the image output apparatus obtains information regarding the specified folder.

12. A method of controlling output of an image through a display of an image output apparatus, the method comprising:
   receiving a user instruction for displaying information regarding a folder specified by a user;
   obtaining first element identification information for identifying a first element included in the specified folder;
   determining whether the first element is a folder based on the first element identification information;
   obtaining second element identification information for identifying a second element included in the first element, when the first element is determined to be the folder;
   analyzing whether the second element is a data file having a data format compatible with the display to generate an analysis result, using compatible data format information indicating one or more data formats from which the image output apparatus can generate an image signal of display data for display;
   determining a display format of the first element that is determined to be the folder based on the analysis result of the second element; and
   generating first display data, which causes the display to display an image that reflects the first element in the determined display format.

13. The image output method of claim 12, further comprising:
   storing, in a memory, display format information that associates a display format of the first element with an analysis result that at least indicates whether the data format of the second element is compatible with the display,
   wherein, when the first element is determined to be the folder, the display format of the first element is determined using the display format information stored in the memory.

14. The image output method of claim 12, further comprising:
   generating second display data, which causes the display to display an image that reflects the first element identified by the first element identification information in a default display format, with information indicating that a display format of the first element has not yet been determined, before displaying the image based on the first display data; and
   instructing the display to switch display from the image generated based on the second display data, to the image generated based on the first display data, such that the image that reflects the first element is displayed in the determined display format when the display format is determined.

15. The image output method of claim 12, wherein, when the second element includes a plurality of elements in one or more lower layers, the method further comprising:
   analyzing the plurality of lower layer elements, one by one, until at least one of the plurality of lower layer elements has the analysis result indicating that the lower layer element is a data file having a data format compatible with the display; and
   determining the display format of the first element based on the analysis result of the lower layer element included in the second element.

16. The image output method of claim 12, further comprising:
   storing the analysis result of the second element in the memory in association with specified folder identification information for identifying the specified folder; and
   generating the first display data based on the analysis result of the second element that is obtained from the memory, in response to a user instruction for instructing display of information regarding the specified folder.

17. The image output method of claim 12, further comprising:
   obtaining header information of the second element; and
   determining whether the second element is a data file having a data format compatible with the display based on the header information.

18. The image output method of claim 12, further comprising:
   obtaining property data regarding only the first element to cause the first display data to additionally include the property data of the first element for display.

19. The image output method of claim 12, wherein, when the second element is determined to be a folder, the method further comprising:
   analyzing whether the second element includes at least one third element that is a data file having a data format compatible with the display to generate an analysis result of the third element; and
   determining the display format of the first element based on the analysis result of the third element.

20. A non-transitory recording medium storing a plurality of instructions which, when executed by a processor, cause the processor to perform an image output method comprising:
   receiving a user instruction for displaying information regarding a folder specified by a user;
   obtaining first element identification information for identifying a first element included in the specified folder;
   determining whether the first element is a folder based on the first element identification information;
   obtaining second element identification information for identifying a second element included in the first element, when the first element is determined to be the folder;
   analyzing whether the second element is a data file having a data format compatible with the display to generate an analysis result, using compatible data format information indicating one or more data formats from which the image output apparatus can generate an image signal of display data for display;

determining a display format of the first element that is determined to be the folder based on the analysis result of the second element; and generating first display data, which causes the display to display an image that reflects the first element in the determined display format.

21. A server for providing data storage services to a display device, the server comprising:
a processor configured to,
receive a request for folder specific information indicating a specified folder,
provide first element identification information for identifying a first element included in the specified folder, the first element identification information being used to determine whether the first element is a folder,
provide second element identification information for identifying a second element included in the first element based on whether the first element is determined to be the folder, and
provide compatible data format information indicating one or more data formats from which an image signal of display data is generated,
the compatible data format information and the second element identification information being used for analyzing whether the second element is a data file that has a data format compatible with a display,
a display format of the first element that is determined to be the folder is determined based on the analyzing, and
first display data is generated which includes an image that reflects the first element in the determined display format.

22. A display device for displaying images based on display data, the display device comprising:
a display controller configured to,
generate an image signal of display data based on a specified folder,
obtain first element identification information for identifying a first element included in the specified folder,
determine whether the first element is a folder based on the first element identification information,
obtain second element identification information for identifying a second element included in the first element from the memory, when the first element is determined to be the folder,
analyze whether the second element is a data file having a data format compatible with the display to generate an analysis result, using compatible data format information indicating one or more data formats from an image signal of display data is generated,
determine a display format of the first element that is determined to be the folder based on the analysis result of the second element,
generate first display data for displaying an image that reflects the first element in the determined display format, and
display an image based on the first display data.

23. The display device of claim 22, wherein the display controller is further configured to:
store display format information that includes a display format of the first element associated with an analysis result that at least indicates whether the data format of the second element is compatible with the display; and determine the display format of the first element using the stored display format information when the first element is determined to be the folder.

24. The display device of claim 22, wherein the display controller is further configured to:
generate second display data, which causes the display to display an image that reflects the first element identified by the first element identification information in a default display format, with information indicating that a display format of the first element has not yet been determined, before displaying the image based on the first display data; and
instruct the display to switch display from the image generated based on the second display data, to the image generated based on the first display data, such that the image that reflects the first element is displayed in the determined display format when the display format is determined.

25. The display device of claim 22, wherein, when the second element includes a plurality of elements in one or more lower layers, the image output apparatus is further configured to:
analyze the plurality of lower layer elements, one by one, until the image output apparatus determines that at least one of the plurality of lower layer elements has the analysis result indicating that the lower layer element is a data file having a data format compatible with the display; and
determine the display format of the first element based on the analysis result of the lower layer element included in the second element.

26. The display device of claim 22, wherein the display controller is further configured to:
store the analysis result of the second element in association with specified folder identification information for identifying the specified folder; and
generate the first display data based on the analysis result of the second element based on an instruction for instructing display of information regarding the specified folder.

27. The display device of claim 22, wherein the display controller is further configured to:
obtain header information of the second element; and
determine whether the second element is a data file having a data format compatible with the display based on the header information.

28. The display device of claim 22, wherein the display controller is further configured to:
obtain property data regarding the first element to cause the first display data to additionally include the property data of the first element for display.

29. The display device of claim 22, wherein, when the second element is determined to be a folder, the display controller is configured to:
analyze whether the second element includes at least one third element that is a data file having a data format compatible with the display;
generate an analysis result of the third element; and
determine the display format of the first element based on the analysis result of the third element.

30. The display device of claim 22, wherein, when the analysis result indicates that the first element does not include any second element that is a data file having a data format compatible with the display, the display controller is further configured to:
determine the display format of the first element such that the first element is displayed in an unselectable format.

* * * * *